United States Patent [19]

Pinson

[11] Patent Number: 4,509,006
[45] Date of Patent: Apr. 2, 1985

[54] MULTIPLE ANNULUS ENERGY STORAGE SYSTEM

[75] Inventor: George T. Pinson, Huntsville, Ala.

[73] Assignee: The Boeing Company, Seattle, Wash.

[21] Appl. No.: 593,259

[22] Filed: Mar. 26, 1984

[51] Int. Cl.³ .............................................. H02K 7/02
[52] U.S. Cl. .......................................... 322/4; 310/74; 310/113; 310/178
[58] Field of Search ....................... 322/4, 100; 310/74, 310/101, 113, 114, 178, 267, 268; 307/84

[56] References Cited
U.S. PATENT DOCUMENTS

| | | | |
|---|---|---|---|
| 3,158,750 | 11/1964 | Roes | 322/4 X |
| 3,683,216 | 8/1972 | Post | 310/74 X |
| 4,086,506 | 4/1978 | Kustom et al. | 310/74 |

Primary Examiner—R. J. Hickey
Attorney, Agent, or Firm—Edwin H. Crabtree

[57] ABSTRACT

A multiple annulus energy storage system for generating and storing electrical power. The system characterized by individual rotating annuli which are permitted to rotate at speeds different from adjacent annuli.

4 Claims, 4 Drawing Figures

MULTIPLE ANNULUS ENERGY STORAGE SYSTEM

BACKGROUND OF THE INVENTION

This invention relates to an electrical storage system and more particularly but not by way of limitation to a multiple annulus energy storage system for generating and storing large amounts of power for extended periods of time.

Heretofore, there have been various ways of generating and storing electrical power. The classical methods associated with storing and generating electrical power are nuclear, fuel oil fire, coal fire and hydroelectric electrical generation systems. Less common electrical power systems include fuel cells, solar cells, rotating solid flywheels, electric or magnetic fields and rotating cellular storage systems.

The methods used to store power for later use include electrical batteries, break down of water into hydrogen and oxygen which are later burned to generate steam which in turn is used to drive a generator, the pumping of water to a reservoir for later use in hydroelectrical generators and magnetic fields. Also, the use of high speed flywheels and homodyne generators have been used. None of the above mentioned methods are efficient or practical for large scale power storage.

Flywheels have long been proposed for use in storing power. These devices proposed to date rely upon the use of relatively small solid flywheels rotating at high speeds. These devices must be designed to withstand forces associated with rotation rates of several thousands of revolutions per minute. The forces associated with these high speeds are destructive in nature and relatively minor defects can cause catastrophic failure of the flywheel.

The subject invention as described herein provides a means to provide the same electrical energy as generated by other systems at a reduced speed and provide for storage of electrical energy in an efficient manner.

SUMMARY OF THE INVENTION

The subject invention provides a means whereby large amounts of power can be stored for extended periods of time. The multiple annulus energy storage system provides electrical power which can be used immediately or stored for use at a later time.

The rotating annuli can be constructed with a large number of variations using various types of rotating rings with the rings operated at speeds commensurate with the strength of the materials used in the ring construction.

The rotating annulus energy storage system for generating and storing electrical power includes a stationary housing having a plurality of field coils mounted in the bottom of the housing. Bearings are mounted in the bottom of the housing for supporting a plurality of rotating annuli. Connected to each of the rotating annuli are electrical poles which are disposed adjacent the field coils. A power system controller is connected via electrical leads to the field coils for receiving and controlling the electrical energy between the generator and the user and reversing the polarity and rotating the annuli in a motor mode during the start up of the system.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
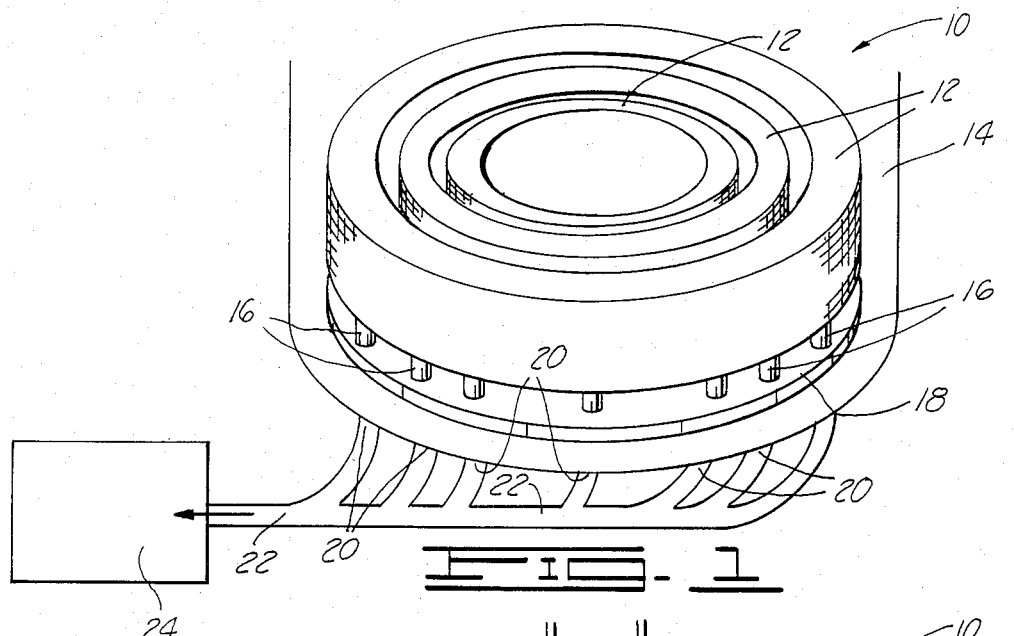
FIG. 1 is a perspective view of the multiple annulus energy storage system.

In FIG. 1 the multiple annulus energy storage system is designated by general reference numeral 10. The storage system 10 is used for generating and storing electrical power and is characterized by a plurality of individual rotating annuli 12 which are mounted inside a stationary housing 14. Each of the annuli 12 have a plurality of electrical poles 16 mounted on the bottom thereof. A bearing 18 which may be mechanical, air, hydraulic or magnetic in nature is received on the bottom of the housing 14 for supporting the annuli 12 and the pole 16. The bearings 18 may be an air bearing, hydraulic bearing, magnetic bearing or any other type of mechanical bearing. Disposed adjacent the poles 16 and mounted inside the stationary housing 14 are a plurality of field coils 20. The coils 20 are connected to electrical leads 22 which in turn are connected to a power system controller 24. The controller 24 is used for controlling the generation of electrical energy from the system 10 and for reversing the polarity of the poles 16 during the initial start-up of the annuli 12 and during the charging cycle.

Figure 2:
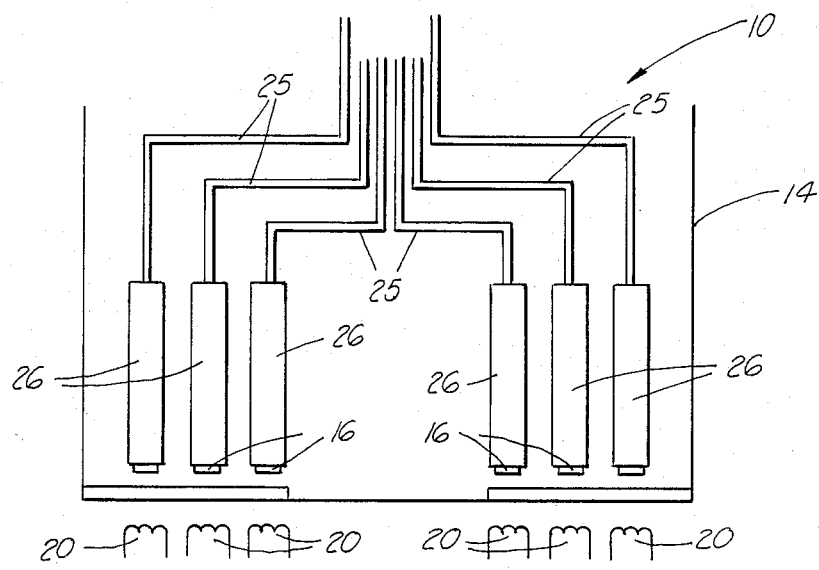
FIG. 2 illustrates hollow rotating shafts which are used to connect the rotating annuli to the electrical poles.

In FIG. 2 hollow rotating shafts 25 are shown connected to rotating elements 26 which are connected to poles 16. The hollow shafts 25 are connected to each of the individual annuli 12.

Figures 3, 4:
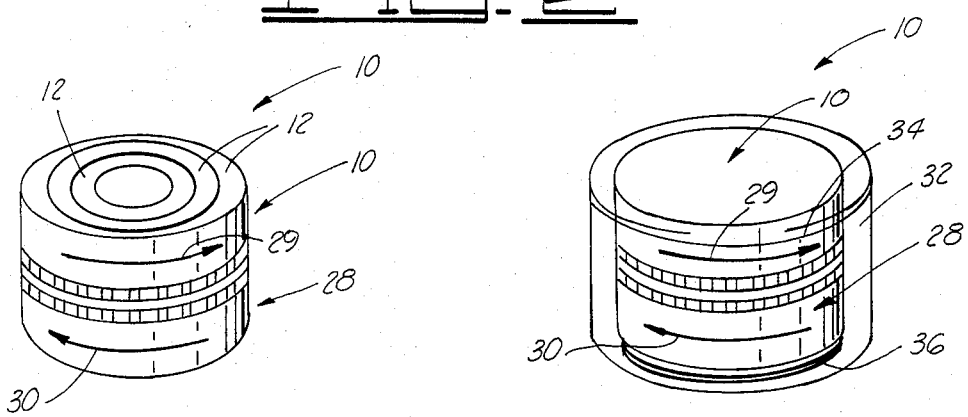
FIG. 3 illustrates as alternate embodiment of the storage system.
FIG. 4 illustrates the system shown in FIG. 3 in a controlled environment.

In FIG. 3 an alternate embodiment of the system 10 is shown with a second multiple annulus energy storage system 28 coacting with the first storage system 10 and rotated in opposite directions as indicated by arrows 29 and 30.

In FIG. 4 the counter rotating storage system 10 and 28 are shown in a controlled and closed environment having a housing 32 with support bearings 34 and 36.

From reviewing the above mentioned drawings, it can be appreciated the rotating annuli 12 are permitted to rotate at speeds independent of the adjacent annuli. In operation, the electrical energy is extracted from the system 10 by the power system controller 24. In this move, the poles interaction with the field coils becomes an electrical generator that provides electrical power through the controller to the user. The system 10 is not only used as a generator 24, the system is used as a motor drive during the initial start-up for rotating the annuli 12. Once the rotating annuli are brought up to speed energy can be extracted by the controller operating the system as a generator through the use of rotational inertia driving one rotating poles past the field coils thereby generating electrical energy which is transmitted to the power user by controller 24.

To illustrate the utility of the system 10, a summary of the basic analysis is shown for a solid rotor as compared to a ring rotor system in the following table. It is noted from this particular example, a three ring system with dimensions as indicated have a total weight of 11,787 pounds with a total energy of $3 \times 10^9$ joules. This energy is compared to the energy in 3 solid rotors with a total weight of 15,561 pounds with an energy storage capability of $3 \times 10^9$ joules.

| CASE | WEIGHT (LB) | TIP SPEED | HEIGHT (FT) |
|---|---|---|---|
| Solid Rotor (4' Radius) | 5,187 | 5,115 | 2 |
| Ring Rotor | | | |
| 4' OD × 3' ID Ring | 3,543 | 4,951 | 2 |
| 3' OD × 2' ID Ring | 3,897 | 4,910 | 4 |
| 2' OD × 1' ID Ring | 4,287 | 5,032 | 6 |

It is important to note that a single solid rotor 4 foot in radius has an energy storage of $1 \times 10^9$ joules and a weight of 5,187 pounds where a single ring rotor 4'OD×3'ID has a weight of 3,543 or approximately 1,500 pounds less. The system 10 placing each of the smaller annuli 12 inside the larger annuli 12 will result in an efficient energy storage system that is unique in its design. Bearings can be placed between each of the annuli 12 to aid in minimizing the load between each of the elements.

For applications requiring high levels of energy storage in a small volume, the annuli 12 can be enclosed in a semivacuum in order to reduce the effects of aerodynamic drag and related effects. A typical design is shown in FIG. 4. This same efficiency can be achieved, however, by permitting the dimensions to increase thereby reducing the RPM of the rotating elements as previously described.

From the above discussion, it can be appreciated the subject multiple annulus energy storage system 10 provides a unique means for generating and providing large amounts of electrical power which can be stored for extended periods of time. Also, the system can provide for generating electrical power which can be used immediately or stored for use at a later time.

Changes may be made in the construction and arrangement of the parts or elements of the embodiments as described herein without departing from the spirit or scope of the invention defined in the following claims.

What is claimed is:

1. A multiple annulus energy storage system for generating and storing electrical power, the system comprising:

a stationary housing;

a plurality of rotating annuli, the annuli disposed inside each other and received inside the housing;

electrical poles connected to each of the annuli;

field coils mounted in the housing and disposed adjacent the electrical poles; and a power system controller connected to the field coils for receiving electrical energy therefrom and reversing the polarity of the system and exciting the coils for rotating the annuli during start up.

2. The system as described in claim 1 further including a bearing mounted in the housing and disposed adjacent the electrical poles for supporting the poles and the annuli thereon.

3. The system as described in claim 1 further including rotating shafts connected to each of the rotating annuli and the electrical poles.

4. A multiple annulus energy storage system for generating and storing electrical power, the system comprising:

a stationary housing;

a bearing surface mounted in the bottom of the stationary housing;

a plurality of rotating annuli, the annuli disposed inside each other and received inside the housing;

electrical poles connected to each of the annuli, the poles disposed above the bearing surface;

field coils mounted in the housing and disposed adjacent the electrical poles; and a power system controller connected to the field coil for receiving electrical energy therefrom and reversing the polarity of the field coils for exciting the poles and driving the individual annuli during start-up of the system.

* * * * *